Figure 1:
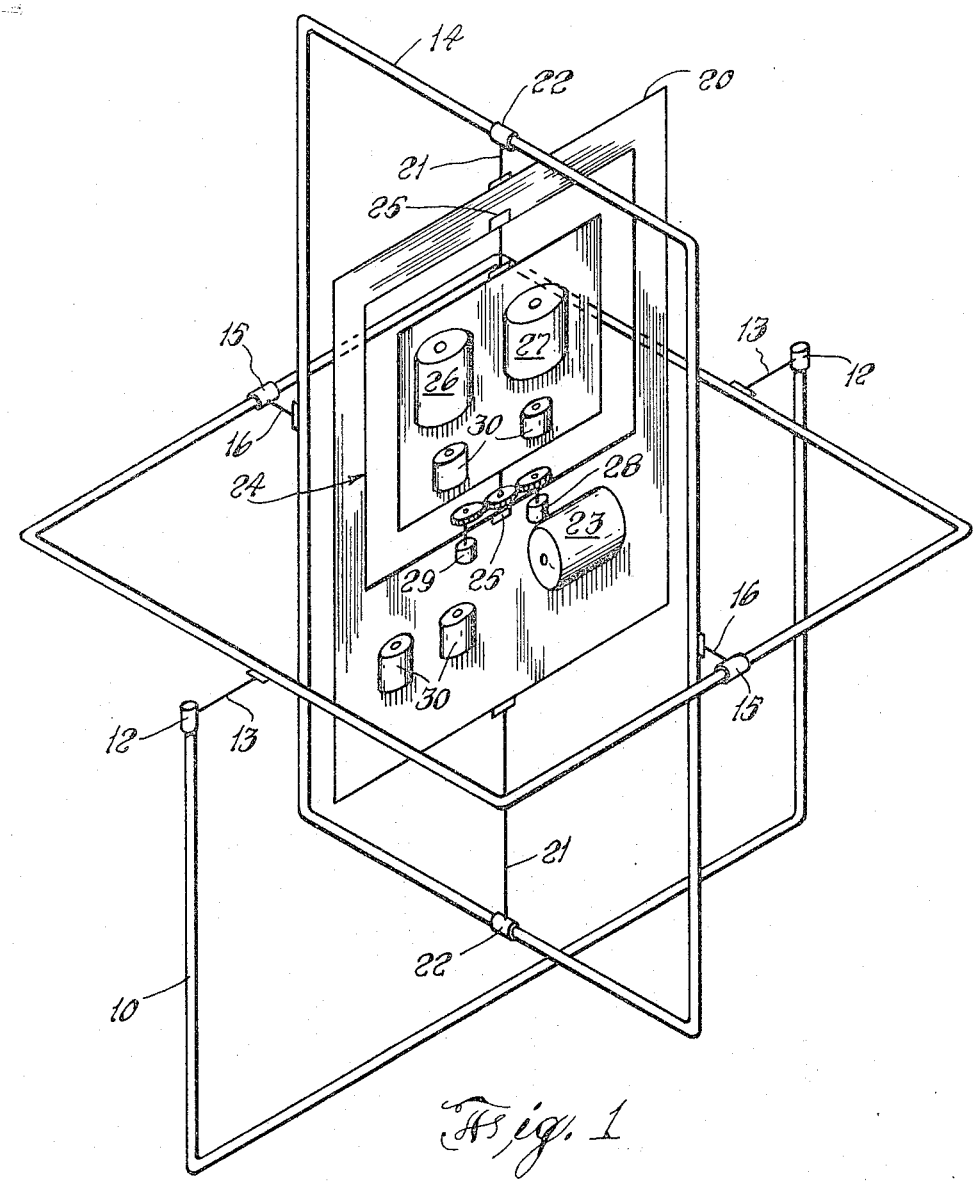

INVENTOR.
BERNARD J. BAECHER
BY Ernest J Weinberger
ATTORNEYS

United States Patent Office 3,310,986
Patented Mar. 28, 1967

3,310,986
THREE AXIS NAVIGATIONAL APPARATUS
Bernard J. Baecher, Sea Cliff, N.Y., assignor to the United States of America as represented by the Secretary of the Navy
Filed May 26, 1964, Ser. No. 370,379
9 Claims. (Cl. 74—5.34)

The invention described herein may be manufactured and used by or for the Government of the United States of America for governmental purposes without the payment of any royalties thereon or therefor.

This invention relates to navigational apparatus and more particularly to apparatus for indicating the position of a moving craft carrying such apparatus.

Upon ships, aircraft and other mobile vehicles the problem of maintaining and determining a stable reference platform and of fixing a reference line in that plane is both difficult and important. This reference is essential for use in steering, navigation and fire control among others and in this regard, the reference platform must remain stable and accurate despite the rolling, pitching and turning of the vehicle. With the advent of modern warfare and weapons, the accuracy of any navigational system, especially an inertial system, determines the ability to effectively use such weapons. Considering present navigational systems which essentially are dead-reckoning devices, it is well known that although in some respects they are self correcting the errors in position indication which do occur from time to time are cumulative. These errors include random variations in gyro drift, changes in gyro torquer scale factor and in torque applied to the gyro and when they exceed a certain predetermined figure, the system must be reset, aligned, and calibrated. One method of resetting and calibration requires the slewing of the stable platform about the azimuth axis so that the east-west and north-south gyros may be interchanged by way of orientation. Since the azimuth gyro, in this slewing operation is being rotated about its input axis it resists this rotation by gyroscopic torques and must be precessed by application of torque about an axis at right angles to its input axis and to its spin axis. The rate at which this gyro can be precessed depends on the angular momentum of the gyro and the maximum torque output of the torquer. If this rate is exceeded the gyro is driven into its stops and the precessing torque is applied by the stops. This procedure usually results in a change in the drift rate of the gyro and is undesirable. With the common types of gyros and torquers the speed of precession is limited and an average period of three hours is necessary, during which time, a certain loss of calibration occurs.

It is, therefore, an object of this invention to provide a three axis inertial navigation system which may be quickly reset and calibrated without the inherent loss of time and calibration during slewing.

A further object is to provide a navigational system which, while it is being reset and calibrated, the azimuth output information thereof is not interrupted and the Z gyro axis scale factor calibrated simultaneously.

Another object of this invention is to provide an improved, simple, inexpensive, easily accessible inertial navigational support structure.

Other objects and advantages will appear from the following description of an example of the invention, and the novel features will be particularly pointed out in the appended claims.

Figure 2:
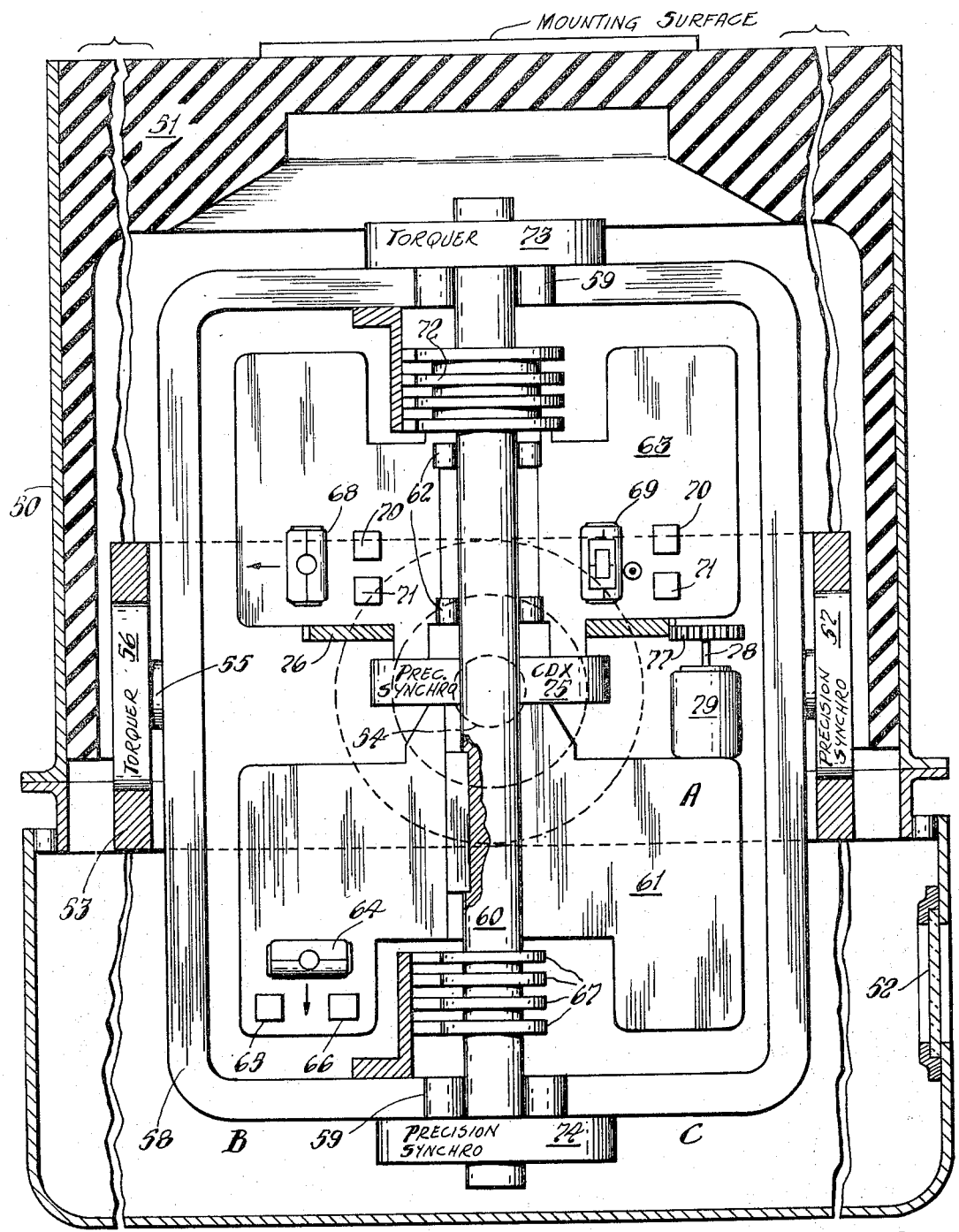

In the accompanying drawings:

FIG. 1 is a diagrammatic representation of the navigational support structure made in accordance with the principles of this invention, FIG. 2 is an illustration of an embodiment made in accordance with this invention.

Diagrammatically illustrated in FIG. 1 is the embodiment of the gimbal system of the improved navigator of this invention wherein the reference frame 10 is affixed by suitable shock mounts (not shown) to the craft within which the system is employed. Gimbal 11 is supported by the frame 10 in bearings 12 for rotation about an axis in plane of deck 13. The gimbal structure 11 in turn supports another or azimuth gimbal 14 by way of bearings 15 for rotation about a horizontal axis 16. A stable platform or sensitive element 20 is supported for rotational movement about an azimuth axis 21 perpendicular to horizontal axis 16 by bearings 22. The stable platform carries for rotation therewith an azimuth or Z gyroscope 23 whose sensitive axis is parallel to the azimuth axis 21. This stable platform in turn carries an auxiliary platform 24 which is free to rotate about the azimuth axis by means of bearings 25 of the stable platform. The auxiliary platform 24 has mounted thereon the cases of an X gyro 26 and a Y gyro 27 whose sensitive axes are perpendicular and normal to the azimuth axis. Means are provided, as for example, with motor 28 which is coupled to angularly displace the auxiliary platform 24 with respect to the sensitive element 20 and with a readout device 29 which indicates this angular displacement. The complete system further includes velocity meters or accelerometers 30 associated with the gyroscopes. The servo loops including torquers are not illustrated although they are well known as applied to control the rotation of the gimbals as well as the synchros which measure and indicate the relative orientation of the gimbals with respect to a fixed reference.

In the illustrated embodiment of FIG. 2, the entire structure is supported by way of frame 50 which is constructed in two sections coupled approximately at the center. Shock mounts 51 are interposed between the frame and the mounting surface. The lower portion of the frame is rotatable with respect to the upper part of the frame and is provided with a circular opening closed by an optical glass plate 52. An outer gimbal ring 53 is supported from the frame by shaft 54 which is free to turn in its bearings. A torquer and a precision synchro are provided to control and measure the angular displacement of the gimbal ring 53 about its shaft. This ring in turn carries a two part shaft member 55 perpendicular to shaft 54, having at its opposite ends a torquer 56 and a precision synchro 57 and is rotatable thereabout. Each part of the shaft 55 supports at diametrically opposite sides an inner gimbal ring 58 which can be rotated by the torquer 56 about shaft 55. Gimbal ring 58 is provided with opposed bearings 59 within which inner shaft 60 is free to rotate about an axis mutually perpendicular to shaft 55 thereby forming an orthogonal set of axes.

Rigidly carried by the inner shaft 60 for rotation therewith is a sensitive element or platform 61 and disposed on the same shaft for independent rotation thereabout by bearings 62 is an auxiliary platform 63. The sensitive platform or azimuth assembly 61 has mounted thereon an azimuth or Z gyro 64 with its sensitive axis aligned with the azimuth in addition to the standard velocity meter 65 and accelerometer 66. The electrical connections to these components are supplied through conventional slip rings and brushes indicated generally at 67. Likewise the auxiliary platform carries an X gyro (North-South) 68 and a Y gyro (East-West) 69 with their sensitive axes aligned as indicated, and their associated accelerometers 70 and velocity meters 71, while the slip ring and brush assembly 72 feeds the electrical input and output signals. The inner shaft 60 has mounted at its opposite ends a torquer 73 and a precision synchro 74 which are based to gimbal 58 and act on or in response to angular rotation of the shaft. Carried on the shaft coupled to the ends of and interposed between the platforms, is a precision synchro control differential transmitter 75 which measures relative angular displacement between the two platforms. Affixed to the lower portion of the auxiliary platform 63 is a ring gear 76 which mates with drive gear 77 mounted on the shaft 78 of motor 79 whereby the platform may be rotated by this motor independently of the rotation of shaft 60. This motor is of the pulse controlled type which can accurately rotate one platform with respect to the other. In order to more fully comprehend to inventive concepts and features of this structure, the following summary of advantages is listed, since it is assumed that the operation of the system is completely understood:

(a) It is possible to obtain a continuous analog output of azimuth during auxiliary platform rotation. And further, the azimuth unit assembly is always directly connected to the output unit (not shown) through one or more precision synchros, (e.g., 74).

(b) There is a reduction in the time of slew of the X and Y gyros without destabilization, by several orders of magnitude (from a period of hours to one of the order of a minute). This has two important advantages: First of all, the time to correct the inertial navigator is reduced and secondly, the correction is more accurate since corrections are based on the assumption that the instrument biases and errors remain constant during the tests to measure them. As the time of measurement is reduced, this assumption becomes more accurate.

(c) The ability to calibrate the Z axis gyro scale factor and simultaneously give continuous analog output of azimuth direction. After all other gyro and VM biases and scale factors have been corrected, this may be effected by pulsing the Z gyro off in azimuth an amount calculated according to its scale factor and at the same time stepping the X and Y gyro or auxiliary platform in the opposite direction by this calculated value. If the Z gyro scale factor is correct, this should keep the X–Y part of the platform at a constant heading. Continuous analog output is obtained by feeding the output of the azimuth sensitive platform through the CDX so that the output of the combination is still the heading effectively determined by the Y gyro. This stepping is continued until a convenient point is reached, say 30 degrees, at which the biases and offsets are redetermined. If no changes in the azimuth offset and the Y gyro bias have occurred, then it can be assumed that the platform has been stepped exactly 30 degrees and the Z gyro scale factor is correct. Any azimuth difference that has to be applied to the platform at this point to reorient the Y gyro is effectively due to an error in the Z gyro scale factor. When this scale factor has been determined, the equipment can then be stepped back to its original position (of alpha=zero), the Z gyro scale factor corrected and normal operations resumed.

(d) This invention permits experimental or actual operation with various types of intermittent rotation about the vertical of the auxiliary assembly, or of the azimuth assembly to determine the best method of operation and also would permit continuous rotation of the various parts of the platform if theoretical considerations indicated the advisability of any such modes of operation.

(e) It further permits the ability to check velocity meters on the azimuth assembly against the velocity meters on the auxiliary platform assembly by the rotation of the velocity meters being compared to a coincident plane. This permits calibration at sea and also permits emergency operation of the equipment with one of the velocity meters on the level-unit assembly part of the platform out of operation. The equipment could take care of failure of either one of these units by proper rotation of the level-unit assembly of the equipment.

(f) There is provided greater accessibility of the roll, pitch and azimuth axes and their associated torquers and synchros for checking and maintenance, and due to the placement and arrangement of the gimbal rings and axes, the use of larger torquers for increased stabilization and to provide greater resistance to destabilization, with additional space required for the installation of precision multispeed synchros on the roll and pitch axes.

(g) Provides mounting areas for an azimuth monitoring gyro if theoretically required in addition to capabilities we already have on the equipment. This azimuth monitoring gyro could be mounted in a position on the azimuth platform as shown in position A.

(h) The design shown makes accessible the azimuth ring 58 for mounting of units that require stabilization in level alone and not stabilization in level and azimuth. For example, the vertical velocity meter which is mounted on the sensitive element of present inertial navigators because of the ease of mounting even though it does not require azimuth stabilization has an attendant disadvantage as the wires to the vertical velocity meter must pass through slip rings. With the present invention the vertical velocity meter could be mounted in either of positions B or C shown on FIG. 2, and no slip rings would have to be interposed between the vertical velocity meter and the terminals on the binnacle.

(i) If a gravity meter were to be mounted, the same statements given in (d) above, for the vertical velocity meter, apply. The gravity meter also could be mounted on the azimuth frame and would not require slip rings between the equipment and the terminals on the binnacle.

It will be understood that various changes in the details, materials and arrangements of parts (and steps), which have been herein described and illustrated in order to explain the nature of the invention, may be made by those skilled in the art within the principle and scope of the invention at expressed in the appended claims.

I claim:

1. A three axis inertial navigation system comprising:
   (a) a first member,
   (b) first means supporting said first member for freedom about a pitch axis,
   (c) a second member,
   (d) second means supporting said second member from said first member for freedom about a roll axis,
   (e) a sensitive platform supported by said second member with freedom about an azimuth axis,
   (f) an auxiliary platform supported by said sensitive platform for independent rotation about said azimuth axis,
   (g) motive means for rotating said auxiliary platform independently of said sensitive platform,
   (h) means for measuring the azimuth angular displacement between said auxiliary and sensitive platforms,
   (i) a Z gyro having its sensitive axis aligned in azimuth and its frame affixed to said sensitive platform,
   (j) servo means coupled with said Z gyro for stabilizing said sensitive platform in azimuth,
   (k) an X gyro having its sensitive axis perpendicular to the sensitive axis of said Z gyro and having its frame affixed to said auxiliary platform,
   (l) a Y gyro having its sensitive axis mutually perpendicular to the sensitive axes of said X and Y gyros and its frame affixed to said auxiliary platform,
   (m) whereby said auxiliary platform may be slewed at a rapid rate about said azimuth axis from its original orientation by said motive means, for calibration and resetting of said X and Y gyros without having to precess said Z gyro and thereafter returned it to its original orientation.

2. A three axis inertial navigational system having X, Y and Z gyros wherein the horizontal gyros may be calibrated and reset without slewing the Z gyro which comprises:
(a) a sensitive platform supported for rotation about the azimuth axis,
(b) an auxiliary platform supported for rotation about the azimuth axis independently of said sensitive platform,
(c) said Z gyro carried by said sensitive platform,
(d) said X and Z gyros carried by said auxiliary platform,
(e) means for rotating said auxiliary platform through a selected angular rotation,
(f) whereby the restriction due to precessing the Z gyro about the azimuth axis is not applicable to the said auxiliary platform when said auxiliary platform is slewed in the calibration and resetting of the X and Y gyros.

3. A three axis navigational apparatus which comprises:
(a) a rigid reference frame,
(b) an outer gimbal mounting carried by said frame for rotation about a pitch axis,
(c) an inner gimbal mounting carried by said outer gimbal mounting for rotation about a roll axis normal to said pitch axis,
(d) a shaft carried by said inner gimbal and rotatable therein about an azimuth axis normal to said roll axes,
(e) an auxiliary platform carried by said shaft for independent rotation thereabout,
(f) a sensitive platform carried by said shaft and rotatable therewith,
(g) X, Y means carried in part by said auxiliary platform for stabilizing said shaft and said sensitive platform in said roll and pitch axes,
(h) Z means carried by said sensitive platform for stabilizing said sensitive platform in said azimuth axis.

4. The apparatus according to claim 3, wherein said X, Y means include:
(a) gyros having their sensitive axes normal to one another and in a plane normal to said azimuth axis and carried by said auxiliary platform and each having an output dependent on the angular velocity about their input axes,
(b) torque drive means coupled to said inner and outer gimbals to rotate said gimbals about their axes in response to said output to stabilize said gimbal axes.

5. The apparatus according to claim 4, wherein said Z means include:
(a) a Z gyro having its sensitive axis parallel to said azimuth axis and providing an output dependent on the angular velocity of the sensitive element about the azimuth axis,
(b) azimuth torque means coupled to said shaft for rotation thereof in response to said output of said Z gyro stabilize the sensitive element about the azimuth axis.

6. The apparatus according to claim 5, further including:
(a) drive means for rotation of said auxiliary platform,
(b) displacement measuring means for measuring the azimuth angular displacement between said auxiliary and sensitive platforms.

7. The apparatus according to claim 6, wherein said displacement measuring means is a synchro control differential transmitter.

8. In a three axis inertial navigation system having a sensitive element rotatable about an azimuth axis and carrying an azimuth gyro having its sensitive axis parallel to said azimuth axis and means for stabilizing said element in azimuth that improvement which comprises:
(a) an auxiliary platform,
(b) means mounting said platform on said element for independent rotation about said azimuth axis,
(c) a pair of level gyros having mutually perpendicular sensitive axes in a plane perpendicular to said azimuth axis,
(d) said pair of level gyros carried by said platform,
(e) means responsive to the outputs of said level and azimuth gyros for applying a torque to cause said element to maintain a stable position.

9. A directional navigational device comprising:
(a) an outer frame,
(b) a first gimbal journalled for rotation in the outer frame about a first axis,
(c) a second gimbal journalled on said first gimbal for rotation about a second axis normal to said first axis,
(d) an azimuth assembly platform journalled on said second gimbal for rotation about an azimuth axis normal to said second axis,
(e) a level assembly platform mounted on said azimuth platform and journalled for rotation about said azimuth assembly.
(f) drive means for rotation of said level platform about said azimuth axis independent of said azimuth platform,
(g) a pair of level gyros having mutually perpendicular sensitive axes carried by said level platform,
(h) an azimuth gyro having its sensitive axis perpendicular to both sensitive axes of said level gyros, carried by said azimuth assembly.

References Cited by the Examiner
UNITED STATES PATENTS 3,050,995   8/1962   Dozier _____ 74—5.34 X FRED C. MATTERN, Jr., *Primary Examiner.*

BENJAMIN A. BORCHELT, *Examiner.*

R. F. STAHL, *Assistant Examiner.*